(12) United States Patent
Keohane et al.

(10) Patent No.: US 7,765,589 B2
(45) Date of Patent: Jul. 27, 2010

(54) METHOD AND APPARATUS FOR DETECTING GRID INTRUSIONS

(75) Inventors: Susann M. Keohane, Austin, TX (US);
Gerald F. McBrearty, Austin, TX (US);
Shawn P. Mullen, Buda, TX (US);
Jessica K. Murillo, Hutto, TX (US);
Johnny M. Shieh, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 270 days.

(21) Appl. No.: 12/123,889

(22) Filed: May 20, 2008

(65) Prior Publication Data

US 2008/0216166 A1 Sep. 4, 2008

Related U.S. Application Data

(63) Continuation of application No. 10/829,856, filed on Apr. 22, 2004, now Pat. No. 7,380,129.

(51) Int. Cl.
G06F 17/30 (2006.01)
(52) U.S. Cl. .............................................. 726/10; 726/3
(58) Field of Classification Search ................... 726/10, 726/5, 3
See application file for complete search history.

(56) References Cited

U.S. PATENT DOCUMENTS 5,796,830 A 8/1998 Johnson et al.
6,754,829 B1 6/2004 Butt et al.
2001/0014943 A1 8/2001 Wray
2005/0240765 A1 10/2005 Genty et al.

OTHER PUBLICATIONS

PFSC: A research on public file scan and certificate in grid; Liang Hu; Lin Lin; Jia Zhao; Machine Learning and Cybernetics, 2009 International Conference on vol. 6 ; Publication Year: 2009 , pp. 3574-3578.*
Browne, "Grid Computing as Applied Distributed Computation: A Graduate Seminar on Internet and Grid Computing", 2004 IEEE International Symposium on Cluster Computing and the Grid, Apr. 19-22, 2004, pp. 239-245.

(Continued)

*Primary Examiner*—David Y Jung
(74) *Attorney, Agent, or Firm*—Okamoto & Benedicto LLP (57) ABSTRACT

A method, apparatus, and computer instructions for authorizing a user to access grid resources. A request is received from the user to access a resource on the data processing system. This request includes a certificate. An authentication process is performed using the certificate when the request is received. In response to successfully authenticating the user in the authentication process, a first host name for the certificate is requested from a trusted source. A reply containing the first host name is received. Access to the resource is provided if the first host name returned by the trusted source matches a second host name for the user from which the request originated.

17 Claims, 5 Drawing Sheets

OTHER PUBLICATIONS

Peng et al., "YellowRiver: A Flexible High Performance Cluster Computing Service for Grid", Proceedings of the Eighth International Conference on High-Performance Computing in Asia-Pacific Region (HPCASIA 2005), Nov. 30-Dec. 3, 2005, 6 pages.

Ong et al., "Gid-Based Decision Support with Pro-Active Mobile Computing", Proceedings of the 2005 IEEE International Conference on Services Computing (SCC 2005), Jul. 11-15, 2005, vol. 2, pp. 59-66.

"Enterprise Identity Mapping", Copyright International Business Machines Corporation, 1998, 2002, eserver, pp. 1-240.

Gheorghiu et al., "Authorization for Metacomputing Applications", High Performance Distributed Computing, Proceedings of the Seventh International Symposium, Jul. 28-31, 1998, 8 pages.

Niinimaki et al., "Using Virtual Organizations Membership System with EDG's Grid Security and Database Access", Proceedings of the 15th International Workshop on Database and Expert Systems Applications, Aug. 30-Sep. 3, 2004, 6 pages.

Wei et al., "VegaFS: A Prototype for File-Sharing Crossing Multiple Administrative Domains", Proceedings of the IEEE International Conference on Cluster Computing, 2003, 8 pages.

* cited by examiner

METHOD AND APPARATUS FOR DETECTING GRID INTRUSIONS

This application is a continuation of application Ser. No. 10/829,856 filed Apr. 22, 2004, status, allowed.

CROSS REFERENCE TO RELATED APPLICATIONS

The present invention is related to an application entitled "Method and Apparatus for Authorizing Access to Grid Resources", Ser. No. 10/829,831, filed even date hereof, assigned to the same assignee, and incorporated herein by reference.

BACKGROUND OF THE INVENTION

1. Technical Field

The present invention relates generally to an improved data processing system and in particular to an improved method and apparatus for managing network resources. Still more particularly, the present invention relates to a method, apparatus, and computer instructions for authorizing a user to access resources on a network and detecting intrusions on a network.

2. Description of Related Art

Network data processing systems are commonly used in all aspects of business and research. These networks are used for communicating data and ideas, as well as, providing a repository to store information. In many cases, the different nodes making up a network data processing system may be employed to process information. Individual nodes may have different tasks to perform. Additionally, it is becoming more common to have the different nodes work towards solving a common problem, such as a complex calculation. A set of nodes participating in a resource sharing scheme are also referred to as a "grid" or "grid network". For example, nodes in a grid network may share processing resources to perform complex computations, such as deciphering keys.

The nodes in a grid network may be contained within a network data processing system, such as a local area network (LAN) or a wide area network (WAN). These nodes also may be located in different geographically diverse locations. For example, different computers connected to the Internet may provide processing resources to a grid network. By applying the use of thousands of individual computers, large problems can be solved quickly. Grids are used in many areas, such as cancer research, physics, and geosciences.

The setup and management of grids are facilitated through the use of software, such as that provided by the Globus Toolkit and the IBM Grid Toolkit. The Globus Toolkit is an open source toolkit used in building grids. This toolkit includes software services and libraries for resource monitoring, discovery, and management, plus security and file management. The toolkit was developed by the Globus Alliance, which is based at Argonne National Laboratory, the University of Southern California's Information Sciences Institute, the University of Chicago, the University of Edinburgh, and the Swedish Center for Parallel Computers. The IBM Grid Toolkit is available from International Business Machines Systems, Inc. (IBM) for use with its systems. Access to grid resources is provided through an authentication process that is executed when a user requests access to the resources. Authentication processes may involve entering a user name or a password. With most grid systems, a certificate is sent as part of the authentication process. In particular, X.509 certificates are used in many grids. These certificates, however, are vulnerable to theft. An unauthorized user may steal the certificate and place that tile on other data processing systems and masquerade as the user. In this manner, the thief may obtain access to resources on the grid and perform tasks without permission. With this type of theft, processing resources revenues may be lost to unauthorized use of grid resources.

Therefore, it would be advantageous to have an improved method, apparatus, and computer instructions for authenticating users requesting access to resources on a network data processing system, such as a grid.

SUMMARY OF THE INVENTION

The present invention provides a method, apparatus, and computer instructions for authorizing a user to access grid resources. A request is received from the user to access a resource on the data processing system. This request includes a certificate. An authentication process is performed using the certificate when the request is received. In response to successfully authenticating the user in the authentication process, a first host name for the certificate is requested from a trusted source. A reply containing the first host name is received. Access to the resource is provided if the first host name returned by the trusted source matches a second host name for the user from which the request originated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
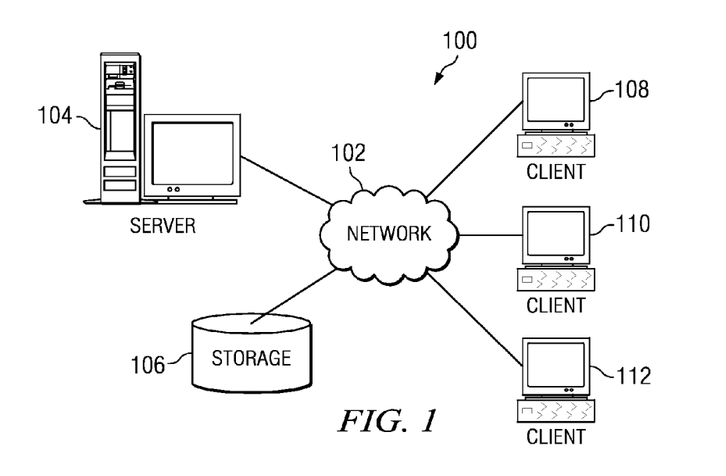
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
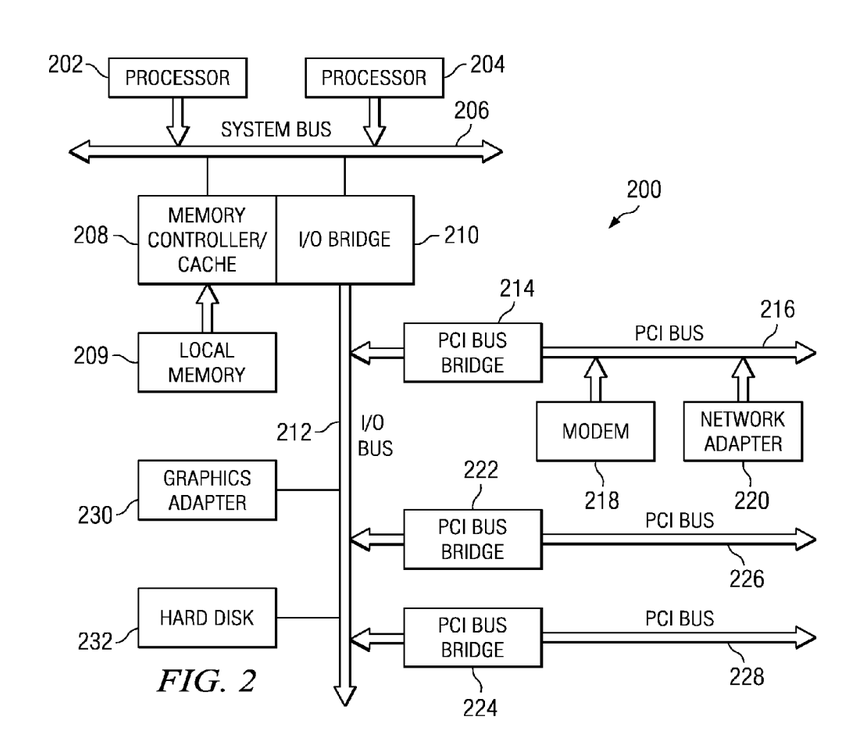
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
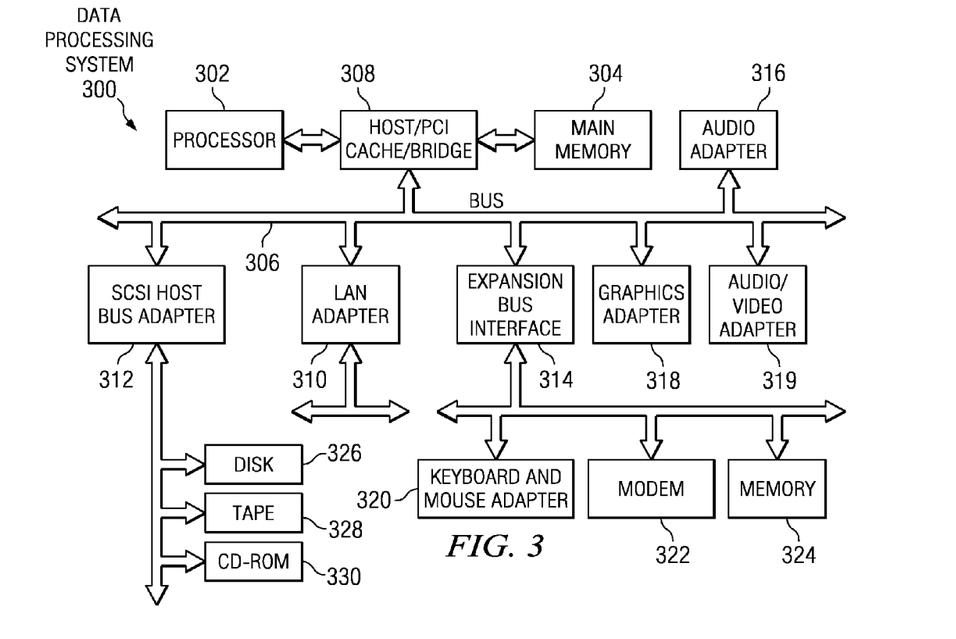
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
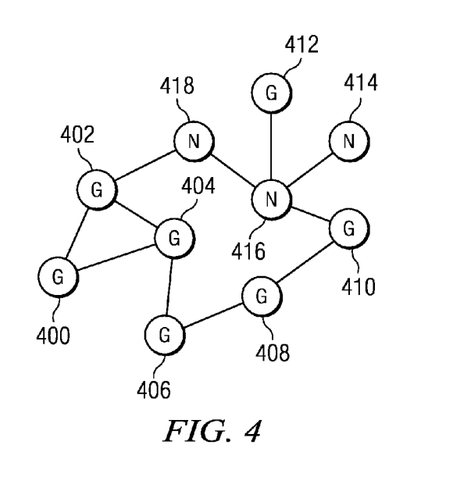
FIG. 4 is a diagram illustrating components used in distributing logical units in a network data processing system in accordance with a preferred embodiment of the present invention.

With reference now to FIG. 4, a diagram illustrating components used in distributing logical units in a network data processing system is depicted in accordance with a preferred embodiment of the present invention. In this example, nodes, 400, 402, 404, 406, 408, 410, and 412 are nodes in grid 414. Nodes 416, 418, and 420 are nodes that are not part of the grid. These nodes may be located in a network data processing system such as network data processing system 100 in FIG. 1. In this example, these nodes are all nodes that are part of a network such as, the Internet, an intranet, a local area network, a wide area network or some combination of these and other types of networks.

The present invention recognizes that certificates, such as X.509 certificates, used in network data processing systems, such as grids, are vulnerable to theft. A certificate may be stolen and placed on another data processing system to access grid resources. One mechanism that may be employed is for the user to issue a proxy certificate, which has a short lifetime, rather than actually submitting the certificate received from the certificate authority. Even with this mechanism, resources may be stolen for a short period of time. The mechanism of the present invention overcomes these problems through having the user submit a host name to the certificate authority when requesting a certificate. When a node, such as node 406 receives a certificate or a proxy certificate, node 406 authenticates the user using the certificate. If the certificate is a proxy certificate, node 406 determines whether the certificate has expired. If the user is authenticated, then node 406 requests a host name from the certificate authority. This host name is compared to the host name at which the user is located. The host name of the user is identified by node 406. This node makes the identification by looking at the connection on which the certificate was received. Based on this connection and the associated IP address for the connection, node 406 can determine the host name from which the request originated. This technique is used because if someone has stolen the certificate, that user is likely to include a false host name. When node 406 queries a certificate authority, the host name stored at the certificate authority is compared to the host name identified by node 406.

If the host name matches, the access to the requested resource in node 406 is provided. Otherwise, access to node 406 is denied and the node may generate an alert indicating that an attempt to illegally access this node has occurred. This alert may be sent to some management process located on another node in the grid and/or may be sent to the certificate authority.

Figure 5A:
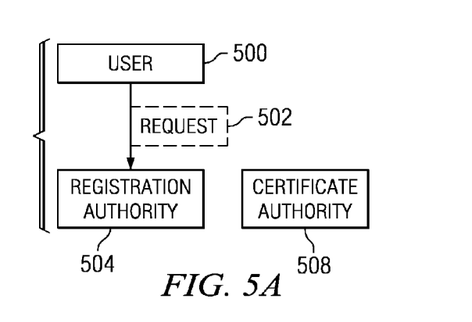
FIGS. 5A-5C are diagrams illustrating the issuing of a certificate in accordance with a preferred embodiment of the present invention.
Figure 5B:
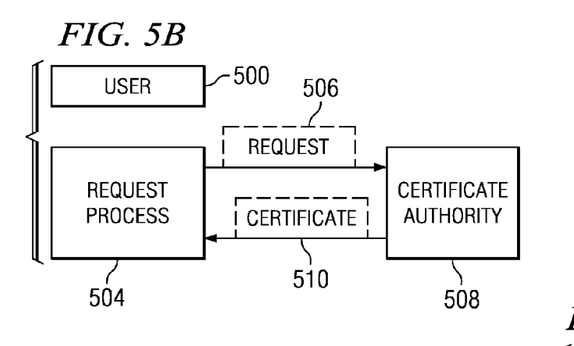
Figure 5C:
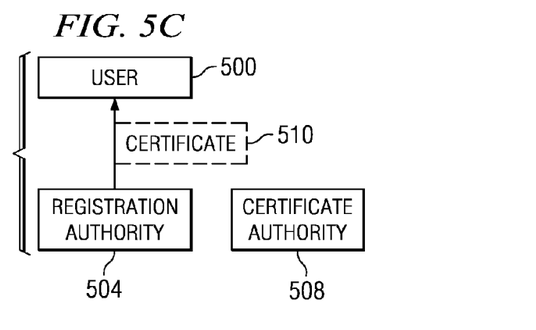

With reference now to FIGS. 5A-5C, diagrams illustrating the issuing of a certificate is depicted in accordance with a preferred embodiment of the present invention. In FIG. 5A, user 500 generates request 502 for a certificate for use in accessing a grid. In this example, "grid-cert-request" is an example of request 502. This request is processed by registration authority 504. In this illustrative example, the process is facilitated by registration authority 504, which vets the identity of the user requesting the certificate. Depending on the implementation, certificate authority 508 may directly process request 502. In either case, certificate authority 508 ultimately processes the certificate request in request 502 and returns a signed certificate back to user 500.

In FIG. 5B, registration authority 504 sends request 506 to certificate authority 508. "$HOME/.globus/usercert_request.pem" is an example of a location and a file name of a request for a certificate. The request at this location is an example of request 506. Request 506, in these illustrative examples of the present invention, includes the host name of the user, in addition to other information describing the user. Depending on the particular implementation, certificate authority 508 may specifically ask the user for the identification of the data processing system on which the certificate will be used. Alternatively, the host name of the data processing system may be identified by registration authority 504 by looking at connection information in the connection between user 500 and registration authority 504. In this case, registration authority 504 will send the host name to certificate authority 508. If user 500 sends request 502 directly to certificate authority 508, certificate authority 508 may identify the host name directly from the connection with the user.

Request 506 conforms to those generated using the Globus Toolkit with an addition of a host name in accordance with a preferred embodiment of the present invention. Certificate authority 508 logs or stores this host name in association with the user, in addition to the normal processing that occurs to issue the certificate to the user.

Certificate 510 is then returned by certificate authority 508 to registration authority 504. Registration authority 508 then returns certificate 510 to user 500. Certificate 510 is now stored at the user's data processing system.

In this example, "$HOME/.globus/usercert.pem" is an example of the path and file name for a certificate, such as certificate 510 at the user's data processing system. In these illustrative examples, certificate 510 is a X.509 certificate. X.509 certificates are currently used in grid systems for authenticating users. The certificate is a public key associated with a digital signature from a certificate authority. The certificate authority signs the certificate by creating a digest, or hash, of all the fields in the certificate and encrypting the hash value with its private key. The signature is placed in the certificate. The certificate may in turn be signed by another certificate authority, forming a chain, which may be followed until the root certificate is found. Certificate 510 is in a standard digital certificate format used to authenticate the user as part of the process of the present invention in these illustrative examples.

In FIG. 5C, certificate 510 is stored at the user's data processing system. Certificate 510 is protected by a passphrase in these examples. Additionally, certificate 510 is privacy-enhanced mail format (PEM) encoded. Further, the user may generate a proxy certificate from certificate 510. In this example, the command grid-cert-init may be used to generate a proxy certificate having the following path and file name: "/tmp/x509.<uid>". This proxy certificate is valid only for a limited period of time, such as 24 hours. In this manner, if the certificate is stolen, it can only be used for a short period of time.

Figure 6A:
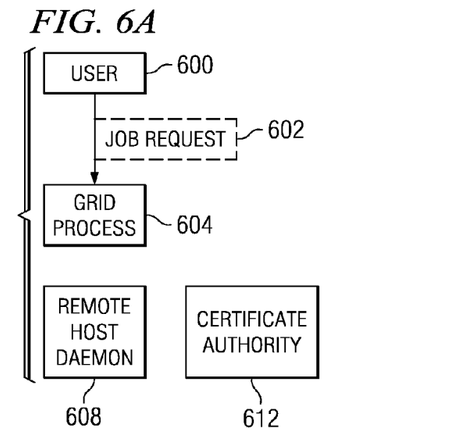
FIGS. 6A-6C are diagrams illustrating data flow in requesting access to a grid resource in accordance with a preferred embodiment of the present invention.
Figure 6B:
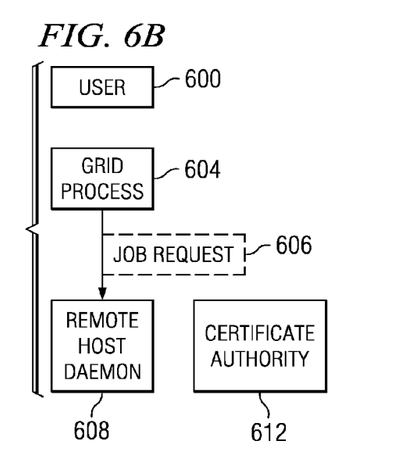
Figure 6C:
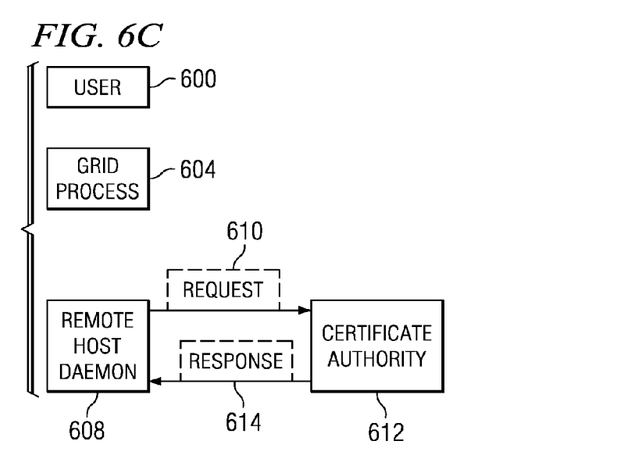

Turning now to FIGS. 6A-6C, diagrams illustrating data flow in requesting access to a grid resource is depicted in accordance with a preferred embodiment of the present invention. In this illustrative example, user 600 sends job request 602 to grid process 604 in FIG. 6A. User 600 and grid process 604 are located on one data processing system. An example of a command used to generate job request 602 is "globusrun -o -r <remote_host><execute job>". In this example, the remote host is an identifier of the grid resource an execute job is the name of a process or task to be run by the grid resource. Grid process 604 is the software employed by a user to generate and send requests to access grid resources on a grid. Grid process 604 may be implemented within the globusrun program in the Globus Toolkit 2.4 or in the IBM Grid Toolbox 2.2. In this case, execution of this process causes the process to look for the proxy certificate and send it for authentication. This process provides a user and interface to generate and send requests to execute tasks or processes. These requests are typically ones requesting access to grid resources to perform a task, such as a numerical calculation.

In FIG. 6B, when grid process 604 receives job request 602, job request 606 is generated and sent to remote host daemon 608. This daemon process is located on a remote data processing system, such as node 406 in FIG. 4. This host daemon may be found in the grid gatekeeper in the Globus Toolkit. This component is modified to include the mechanisms of the present invention.

This remote host daemon is a process on a node that receives requests to access grid resources on a node and determines whether to allow access to those resources. Job request 606 includes a proxy certificate in these illustrative examples.

Remote host daemon 608 performs an authentication process on the certificate received in job request 606. If the user is authenticated, remote host daemon 608 performs an additional step in determining whether to allow user 600 access to grid resources. In these illustrative examples, remote host daemon 608 sends request 610 to certificate authority 612 in FIG. 6C. Request 610 includes a request for a revocation list and a host name. Certificate authority 612 authenticates remote host daemon 608 when request 610 is received.

Certificate authority 612 maintains a revocation list, which is used to identify certificates that have been recently recalled. Further, in these illustrative examples, certificate authority 612 also contains a list of host names in association with users and their certificates.

Additionally, certificate authority 612 is in a unique position to detect if a certificate has been stolen and is being run from an alternate data processing system. Request 610 also includes the certificate received in job request 606 or some other identification of the user. With the certificate for the user, the host name associated with the certificate is identified and returned in response 614 along with a certificate revocation list if remote host daemon 608 is authenticated.

When response 614 is received, remote host daemon 608 determines whether the certificate received in job request 606 is on the certificate revocation list. If the certificate is not on the revocation list, remote host daemon 608 returns the host name returned by certificate authority 612 with the host name of the data processing system from which job request 606 originated. If the host name matches, access to grid resources is provided.

Otherwise, access is denied and an alert is generated in these illustrative examples. This alert is sent to certificate authority 612 and/or another management process. With this alert, appropriate measures or monitoring may be initiated to prevent further intrusions into the grid. These measures may include, for example, placing the certificate on a revocation list or identifying the host from which the stolen proxy originated.

By comparing host names, the present invention allows for detection of attempts to illegally access grid resources. This type of comparison may be used equally well with certificates and proxy certificates. Even though proxy certificates only last a short time, the fact that one proxy certificate has been stolen means that another could be stolen at a later time through the same means used to steal the first proxy certificate.

Figure 7:
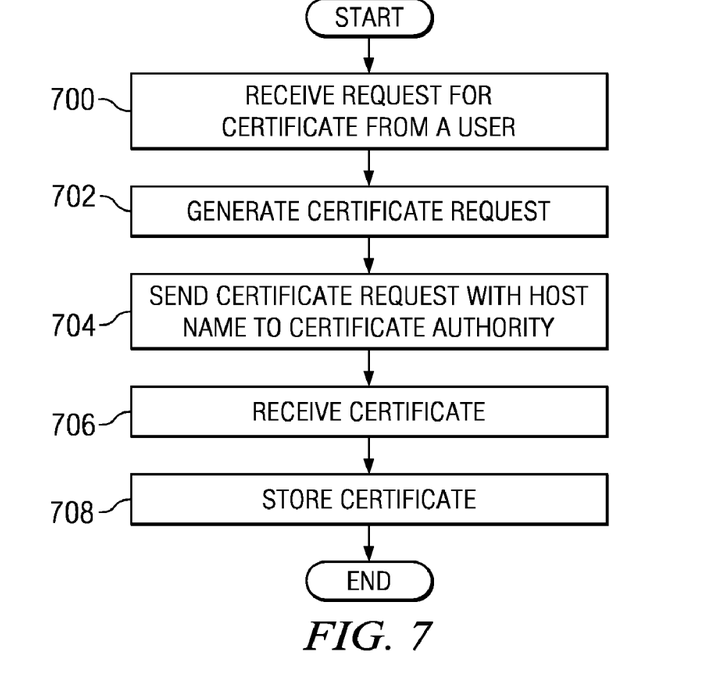
FIG. 7 is a flowchart of a process for obtaining a certificate in accordance with a preferred embodiment of the present invention.

With reference now to FIG. 7, a flowchart of a process for obtaining a certificate is depicted in accordance with a preferred embodiment of the present invention. The process illustrated in FIG. 7 may be implemented in a user data processing system, such as data processing system 300 in FIG. 3. More specifically, this process may be implemented in a registration authority, such as registration authority 504 in FIG. 5.

The process begins by receiving a request for a certificate from a user (step 700). Next, the certificate request is generated (step 702). Then, a certificate request is sent to the certificate authority (step 704). The request in step 704 includes the host name of the data processing system from which the user generated the request. A certificate is received (step 706). Then, the certificate is stored (step 708) with the process terminating thereafter. The certificate is stored in step 708 by sending the certificate to the user's data processing system. This certificate is included in requests to access grid resources.

Figure 8:
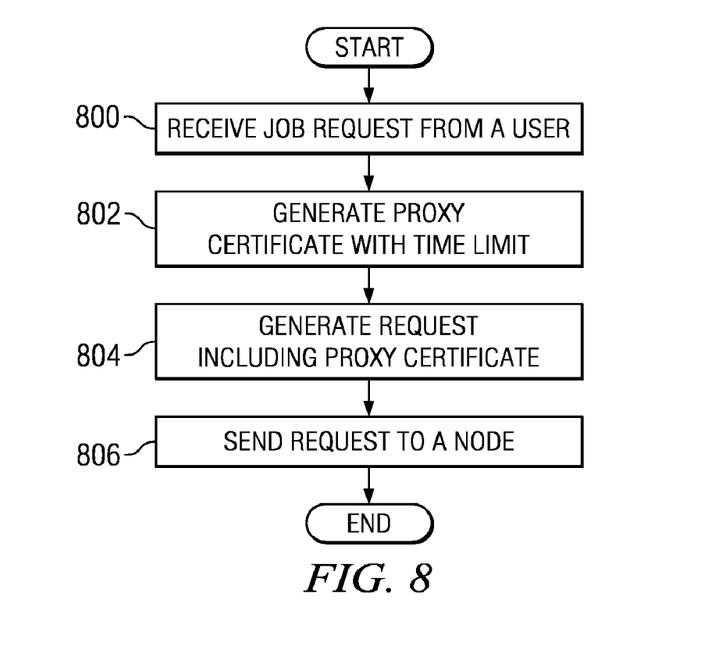
FIG. 8 is a flowchart of a process for requesting access to a grid resource in accordance with a preferred embodiment of the present invention.

With reference now to FIG. 8, a flowchart of a process for requesting access to a grid resource is depicted in accordance with a preferred embodiment of the present invention. The process illustrated in FIG. 8 may be implemented in a grid process, such as grid process 604 in FIG. 6.

The process begins by receiving a job request from a user (step 800). Next, a proxy certificate is generated with a time limit (step 802). In these illustrative examples, step 802 is an optional but suggested step for limiting the use of the certificate in case it is stolen. Then, a request is generated including the proxy certificate (step 804). Next, the request is sent to a node (step 806) with the process terminating thereafter.

Figures 9, 10:
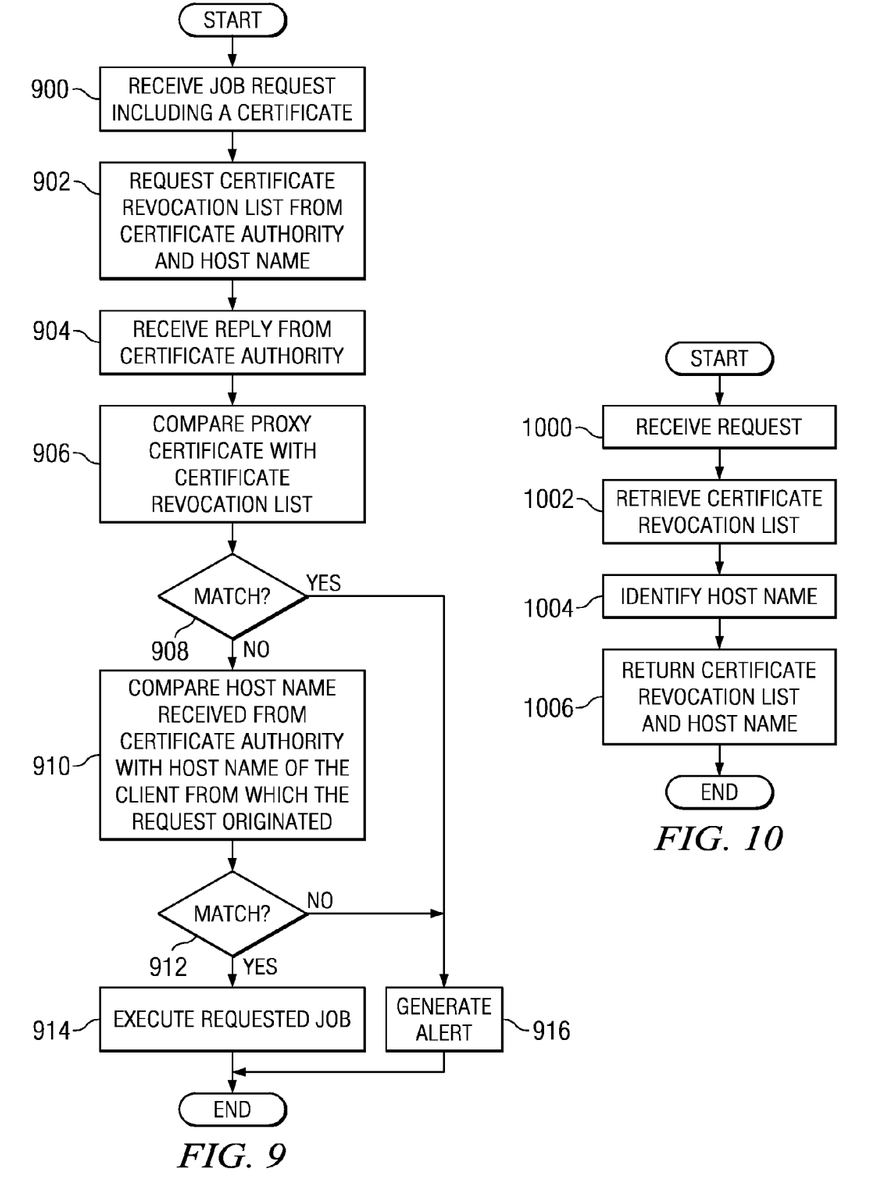
FIG. 9 is a flowchart of a process for processing a request to access grid resources in accordance with a preferred embodiment of the present invention.
FIG. 10 is a flowchart of a process for managing a request for authentication information in accordance with a preferred embodiment of the present invention.

With reference now to FIG. 9, a flowchart of a process for processing a request to access grid resources is depicted in accordance with a preferred embodiment of the present invention. The process illustrated in FIG. 9 may be implemented in a grid node process, such as remote host daemon 608 in FIG. 6.

The process begins by receiving a job request including a proxy certificate (step 900). Next, a certificate revocation list is requested from a certificate authority and host name (step 902). This request is made by including the proxy certificate in these illustrative examples. A reply is received from the certificate authority (step 904). This reply includes the certificate revocation list and the host name associated with the certificate.

Then, the proxy certificate is compared with the certificate revocation list (step 906). Next, a determination is made as to whether a match is made (step 908). If a match between the proxy certificate and the list is not present, the host name received from the certificate authority is compared with host name of the client from which the request originated (step 910). Next, a determination is made as to whether a match between the host names is present (step 912). Step 912 is employed to determine whether the certificate is being used on an authorized data processing system.

If a match is present, the requested job is executed (step 914) with the process terminating thereafter. Referring back to step 908, if a match is present, then an alert is generated (step 916), with the process terminating thereafter. In this case, the proxy certificate has been revoked. In step 912 if match is absent, then an alert is generated, with the process terminating thereafter. In this case, the proxy certificate is being used from a location other than that for the user.

Turning now to FIG. 10, a flowchart of a process for managing a request for authentication information is depicted in accordance with a preferred embodiment of the present invention. The process illustrated in FIG. 10 may be implemented at a certificate authority, such as certificate authority 612 in FIG. 6.

The process begins by receiving a request for a certificate revocation list and a host name from a node (step 1000). In these illustrative examples, the request also includes the certificate identifying the user requesting access to the grid resources. The certificate revocation list is retrieved (step 1002), and a host name is identified from the request (step 1004). The host name is identified from a certificate included in the request received in step 1000. The certificate revocation list and the host name are returned to the node (step 1006) with the process terminating thereafter.

Thus, the present invention provides a method, apparatus, and computer instructions for identifying unauthorized attempts to access grid resources. The mechanism of the present invention authorizes a user based on the host name of the data processing system from which the request originated and the host name associated with the certificate for the user. This step is taken in addition to the other authentication processes currently performed. The mechanism of the present invention works equally well with certificates and proxy certificates to provide additional safeguards against unauthorized use of grid resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the illustrative examples are described with respect to grids, the mechanisms of the present invention may be applied to network data processing systems other than grids. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for authorizing a user to access grid resources, the data processing system comprising:
    receiving means for receiving a request from the user to access a resource on the data processing system, wherein the request includes a certificate;
    performing means, responsive to receiving the request, for performing an authentication process using the certificate;
    requesting means, responsive to successfully authenticating the user in the authentication process, for requesting a first host name for the certificate from a trusted source; and
    providing means, responsive to receiving the first host name, for providing access to the resource if the first host name returned by the trusted source matches a second host name for the user from which the request originated.

2. The data processing system of claim 1, wherein the trusted source is a certificate authority.

3. The data processing system of claim 1, wherein the requesting means is a first requesting means and further comprising:
    second requesting means, responsive to successfully authenticating the user in the authentication process, for requesting a revocation list from the trusted source;
    determining means for determining whether the certificate has been revoked using the revocation list; and
    preventing means for preventing access to the resource if the certificate has been revoked.

4. The data processing system of claim 1, wherein the certificate is a proxy certificate, wherein the proxy certificate is valid only for a selected period of time.

5. The data processing system of claim 1, wherein the first host name is for a client data processing system for the user and is registered with the trusted source when the certificate is issued.

6. The data processing system of claim 1, wherein the certificate is an X.509 certificate.

7. The data processing system of claim 1, wherein the access to the resource is to run a task on the data processing system.

8. The data processing system of claim 1, wherein the data processing system is part of a grid.

9. A computer program product in a computer readable medium for authorizing a user to access grid resources, the computer program product comprising:
    first instructions for receiving a request from the user to access a resource on the data processing system, wherein the request includes a certificate;
    second instructions for responsive to receiving the request, performing an authentication process using the certificate;
    third instructions, responsive to successfully authenticating the user in the authentication process, for requesting a first host name for the certificate from a trusted source; and
    fourth instructions, responsive to receiving the first host name, for providing access to the resource if the first host name returned by the trusted source matches a second host name for the user from which the request originated.

10. The computer program product of claim 9, wherein the trusted source is a certificate authority.

11. The computer program product of claim 9 further comprising:
    fifth instructions, responsive to successfully authenticating the user in the authentication process, for requesting a revocation list from the trusted source;
    sixth instructions for determining whether the certificate has been revoked using the revocation list; and
    seventh instructions for preventing access to the resource if the certificate has been revoked.

12. The computer program product of claim 9, wherein the certificate is a proxy certificate, wherein the proxy certificate is valid only for a selected period of time.

13. The computer program product of claim 9, wherein the first host name is for a client data processing system for the user and is registered with the trusted source when the certificate is issued.

14. The computer program product of claim 9, wherein the certificate is an X.509 certificate.

15. The computer program product of claim 9, wherein the access to the resource is to run a task on the data processing system.

16. The computer program product of claim 9, wherein the data processing system is part of a grid.

17. A data processing system comprising:
    a bus system;
    a memory connected to the bus system, wherein the memory includes a set of instructions; and
    a processing unit connected to the bus system, wherein the processing unit executes a set of instructions to receive a request from a user to access a resource on the data processing system, wherein the request includes a certificate; perform an authentication process using the certificate, in response to receiving the request; request a first host name for the certificate from a trusted source, in response to successfully authenticating the user in the authentication process; and provide access to the resource if the first host name returned by the trusted source matches a second host name for the user from which the request originated, in response to receiving the first host name.

* * * * *